US012548548B2

(12) United States Patent
Layton

(10) Patent No.: US 12,548,548 B2
(45) Date of Patent: Feb. 10, 2026

(54) BAFFLE STRUCTURE INDUCED AMPLITUDE AND PHASE DIFFERENCES

(71) Applicant: Microsoft Technology Licensing, LLC, Redmond, WA (US)

(72) Inventor: Leonard Charles Layton, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 18/407,207

(22) Filed: Jan. 8, 2024

(65) Prior Publication Data

US 2025/0225975 A1 Jul. 10, 2025

(51) Int. Cl.
| | |
|---|---|
| *G10K 11/28* | (2006.01) |
| *G01S 3/803* | (2006.01) |
| *G01S 3/808* | (2006.01) |
| *H04R 1/40* | (2006.01) |
| *H04R 3/00* | (2006.01) |

(52) U.S. Cl.
CPC .............. *G10K 11/28* (2013.01); *G01S 3/803* (2013.01); *G01S 3/8083* (2013.01); *H04R 1/406* (2013.01); *H04R 3/005* (2013.01); *H04R 2499/15* (2013.01)

(58) Field of Classification Search
CPC ....... G01S 3/8083; G01S 3/803; G10K 11/28; H04R 1/406; H04R 3/005; H04R 2499/15
See application file for complete search history.

(56) References Cited

U.S. PATENT DOCUMENTS

| | | | |
|---|---|---|---|
| 4,831,656 A | 5/1989 | Southern et al. | |
| 6,158,902 A | 12/2000 | Staat | |
| 6,332,029 B1 * | 12/2001 | Azima | H04R 1/021 381/337 |
| 6,904,154 B2 * | 6/2005 | Azima | H04R 1/021 381/431 |
| 7,123,456 B2 * | 10/2006 | Kamata | G11B 5/3932 29/603.15 |
| 7,158,647 B2 * | 1/2007 | Azima | H04R 7/06 381/431 |
| 7,194,098 B2 * | 3/2007 | Azima | B60R 11/0217 381/431 |

(Continued)

Primary Examiner — Daniel L Murphy
Assistant Examiner — Amie M Ndure
(74) Attorney, Agent, or Firm — Alleman Hall LLP

(57) ABSTRACT

A computing system comprises an auditory system exposed to an environment. The auditory system comprises a microphone that receives sonic waveforms and outputs audio signals. A baffle structure comprising multiple paths for every arriving sonic waveform is located between the microphone and the environment. The baffle structure is configured to, based at least on an angle of arrival for a sonic waveform, induce frequency dependent amplitude differences and phase differences for the sonic waveform over a range of frequencies. A processing system is communicatively coupled to the microphone. The processing system is configured to receive audio signals from the microphone representing the sonic waveform, to identify a source of the sonic waveform based at least on the received audio signals, and to output an estimated angle of arrival for the sonic waveform based at least on amplitudes and phases of the received audio signals and characteristics of the baffle structure.

20 Claims, 13 Drawing Sheets

(56) References Cited

U.S. PATENT DOCUMENTS

| | | | |
|---|---|---|---|
| 8,903,106 B2 * | 12/2014 | Meyer | H04R 3/005 381/92 |
| 10,129,681 B2 * | 11/2018 | Riggs | H04R 29/00 |
| 10,939,225 B2 * | 3/2021 | Riggs | H04R 3/005 |
| 11,564,038 B1 * | 1/2023 | Ahrens | H04R 5/033 |
| 2002/0027999 A1 * | 3/2002 | Azima | H04R 7/20 381/431 |
| 2002/0030951 A1 * | 3/2002 | Kamata | B82Y 40/00 29/603.15 |
| 2003/0188920 A1 | 10/2003 | Brawley | |
| 2005/0147273 A1 * | 7/2005 | Azima | H04R 5/02 381/431 |
| 2005/0147274 A1 * | 7/2005 | Azima | G06F 1/1688 381/431 |
| 2006/0159293 A1 * | 7/2006 | Azima | G06F 1/1601 381/87 |
| 2007/0064925 A1 | 3/2007 | Suzuki et al. | |
| 2007/0201710 A1 | 8/2007 | Suzuki et al. | |
| 2009/0238397 A1 | 9/2009 | Reiss et al. | |
| 2009/0310808 A1 | 12/2009 | Button et al. | |
| 2010/0202628 A1 * | 8/2010 | Meyer | H04R 3/005 381/92 |
| 2013/0039523 A1 | 2/2013 | Van Dijk | |
| 2015/0110288 A1 * | 4/2015 | Meyer | H04R 1/406 381/92 |
| 2016/0044408 A1 | 2/2016 | Akino | |
| 2016/0192102 A1 * | 6/2016 | Estrada | H04R 5/027 381/26 |
| 2016/0269821 A1 | 9/2016 | Akino | |
| 2016/0269849 A1 * | 9/2016 | Riggs | H04S 7/304 |
| 2019/0098431 A1 * | 3/2019 | Riggs | H04S 7/301 |
| 2019/0364378 A1 * | 11/2019 | Riggs | H04R 29/00 |
| 2020/0152216 A1 | 5/2020 | Shim et al. | |
| 2020/0154201 A1 | 5/2020 | Townsend et al. | |
| 2021/0033728 A1 | 2/2021 | Ma et al. | |
| 2021/0329374 A1 | 10/2021 | Kanamori | |
| 2023/0014683 A1 | 1/2023 | Mclaren | |
| 2024/0073589 A1 * | 2/2024 | Price | H04R 9/025 |

* cited by examiner

BAFFLE STRUCTURE INDUCED AMPLITUDE AND PHASE DIFFERENCES

BACKGROUND

Humans and other animals possess the ability to discern many sounds within an environment. The combination of auditory receivers (e.g., ears) and auditory processing in the brain allows animals to recognize a sound source, and to determine an angle of arrival and a distance of sound emanating from that sound source. Digital devices are challenged to provide similar audio recognition features. Devices must include expensive microphone arrays with numerous microphones, and/or complex audio processing systems to discern spatial information from received audio. Such systems are generally not compatible with smaller, mobile devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing system is presented. The computing system comprises an auditory system exposed to an environment. The auditory system comprises a microphone that receives sonic waveforms and outputs audio signals. A baffle structure is located between the microphone and the environment. The baffle structure comprises multiple paths for every arriving sonic waveform. The baffle structure is configured to, based at least on an actual angle of arrival for a sonic waveform, induce frequency dependent amplitude differences and phase differences for the sonic waveform over a range of frequencies. A processing system is communicatively coupled to the microphone. The processing system is configured to receive audio signals from the microphone representing the sonic waveform, to identify a source of the sonic waveform based at least on the received audio signals, and to output an estimated angle of arrival for the sonic waveform based at least on amplitudes and phases of the received audio signals and characteristics of the baffle structure.

DETAILED DESCRIPTION

Existing microphone array approaches for voice communications and speech recognition have limited performance in terms of spatial discrimination and signal-to-noise ratio unless several microphone elements are employed which increases costs, complexity, and digital signal processing overhead.

Figure 1:
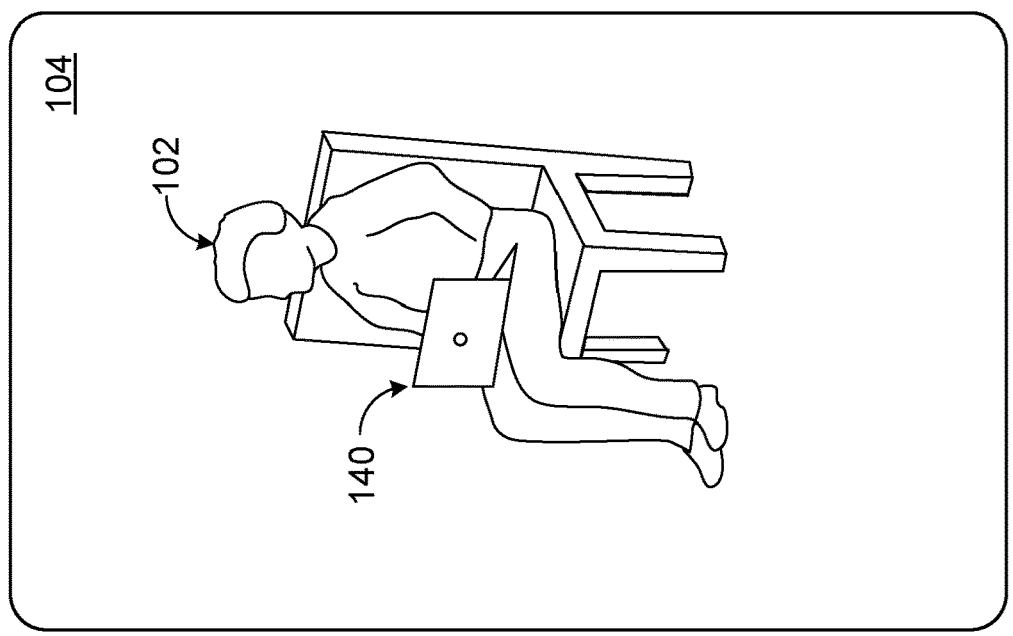
FIG. 1 shows an example remote meeting scenario.
Figure 1:
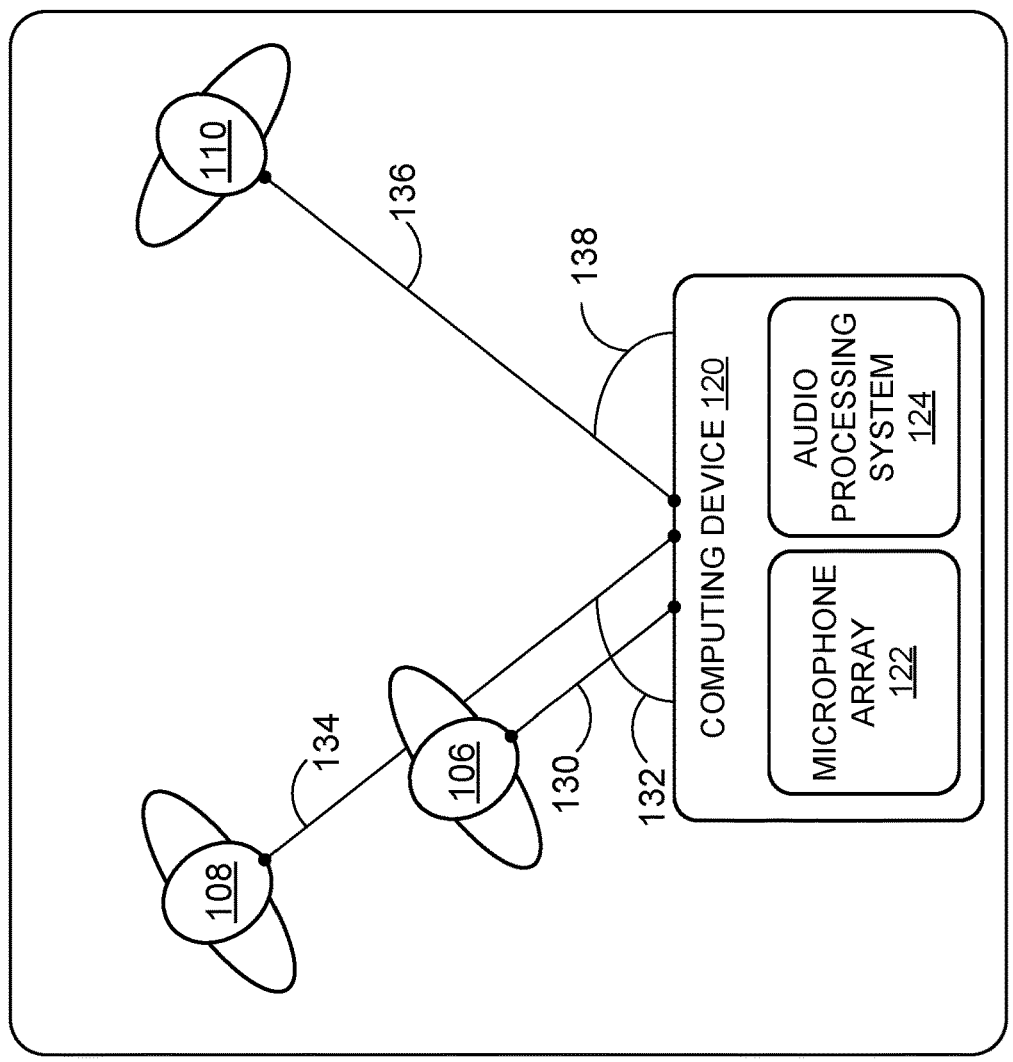

As an example, FIG. 1 depicts a hybrid meeting scenario 100 where a participant 102 in a remote location 104 desires to be able clearly hear and identify one of several participants (106, 108, 110) talking in a common meeting location 112. A single computing device 120 located within meeting location 112 is used to capture voices of the several participants. Computing device 120 includes a microphone array 122 comprising one or more microphones, and an audio processing system 124 which can encode digital audio data with metadata, such as the identity and location of a talker.

In such a scenario, people in common meeting location 112 may be seated at arbitrary locations in the room and at different distances and angles from computing device 120. In this example, participant 106 is located at a first distance 130 and a first angle 132 from computing device 120. Participant 108 is located at a second distance 134 from computing device 120, longer than first distance 130. Participant 108 is located behind participant 106 at first angle 132 from computing device 120. Participant 110 is located at a third distance 136 from computing device 120, equal to second distance 134. Participant 110 is located at a second angle 138 from computing device 120, at a reflection of first angle 132.

Participants 106, 108, and 110 may talk simultaneously or laugh and react to what is being said resulting in many scenarios where their speech overlaps. These scenarios are very challenging for remote participants using existing microphone systems. Participant 102, listening via computing device 140, may be subject to the "cocktail party effect" where spatial information for the different local participants is muddled, yielding low signal-to-noise (SNR) ratios. Discriminating individual talkers in such a scenario is thus challenging.

In contrast, were participant 102 in common meeting location 112, they would receive binaural information that would inform the locations and identities of other participants. Despite only having two audio receivers, humans demonstrate high spatial resolution (e.g., less than 5 degrees). The ears are separated by a head which acts as a baffle, imparting time delay and frequency-dependent occlusion and diffraction between the ears. This yields differences between the signals received at the left and right eardrums, leading to differences in amplitude frequency response.

Within the ear itself, pinnae add additional frequency and phase response variations based on the angle of sound arrival. When combined with the head, they form a convoluted occlusion baffle that causes differential transfer functions from a specific location in the environment to each of the eardrums to vary with angle of arrival, e.g., sounds from the right of the head arrive later and at a lower amplitude at the left ear drum compared to the right. The convoluted folds of the pinna also cause a change in frequency and phase responses based on angle of arrival. Animals with highly developed hearing, such as bats, have evolved highly specific pinna as well as corresponding signal processing in their brains with which to hear with incredibly high levels of spatial discernment.

This arrangement allows the animal to monitor a sphere of sound from the entire surrounding environment, and to discriminate the location of those sounds, both from a direction and distance standpoint. Much information is gained from the spectral differences in time differences for sounds arriving in one ear versus the other ear. Human speech is concentrated between 300 Hertz and about 3.5 kilohertz, and thus the human hearing system is most sensitive in this range.

Pseudo binaural effects have been seen in some devices where microphones are occluded by the device itself, such as large camcorders with left and right-side microphones. For practical microphone systems to be incorporated into mobile devices, such a head is impractical. Rather, a baffle may be used to induce changes in transfer functions and effectively unroll the head into a linear structure. This may provide the differential phase and amplitude differences in a more compact fashion.

As such, this disclosure presents systems that induce frequency dependent amplitude differences and phase differences for sonic waveforms over a range of frequencies. A baffle comprising multiple paths for every arriving sonic waveform can be positioned between a microphone and an environment. A processing system communicatively coupled to the microphone can then process digitized audio signals and indicate an angle of arrival for the sonic waveform. When two microphones are present, each with a unique baffle structure, a distance from the source of the sonic waveform may be determined.

The systems and methods described herein may thus be used to mimic animal hearing capabilities by inducing angle of arrival-based differences in amplitude and phase, such that a processing algorithm can extract useful information while rejecting background noise. This allows the system to programmatically focus on a particular sound source, label the sound source, and track it across the environment relative to the computing system. Thus, the system can accurately determine an angle of arrival, increase SNR for spatially separated sources, and assist in source separation. Such features are not capable with single microphone systems or even dual microphone systems that do not comprise such a baffle structure.

As such, a computing system may be able to capture an auditory scene, such as meeting location 112, and relay that auditory information to a remote location (e.g., remote location 104) in a way so a remote user can listen to the scene as if they were physically present, be that in stereo or spatial audio. The baffle structure may be designed to be small enough to be incorporated into relatively thin, mobile devices. The audio information received at a processor may encode enough amplitude and phase differences to enable enhanced SNR for speech capture, and to inform spatial capture for encoding into a spatial audio format.

Figure 2:
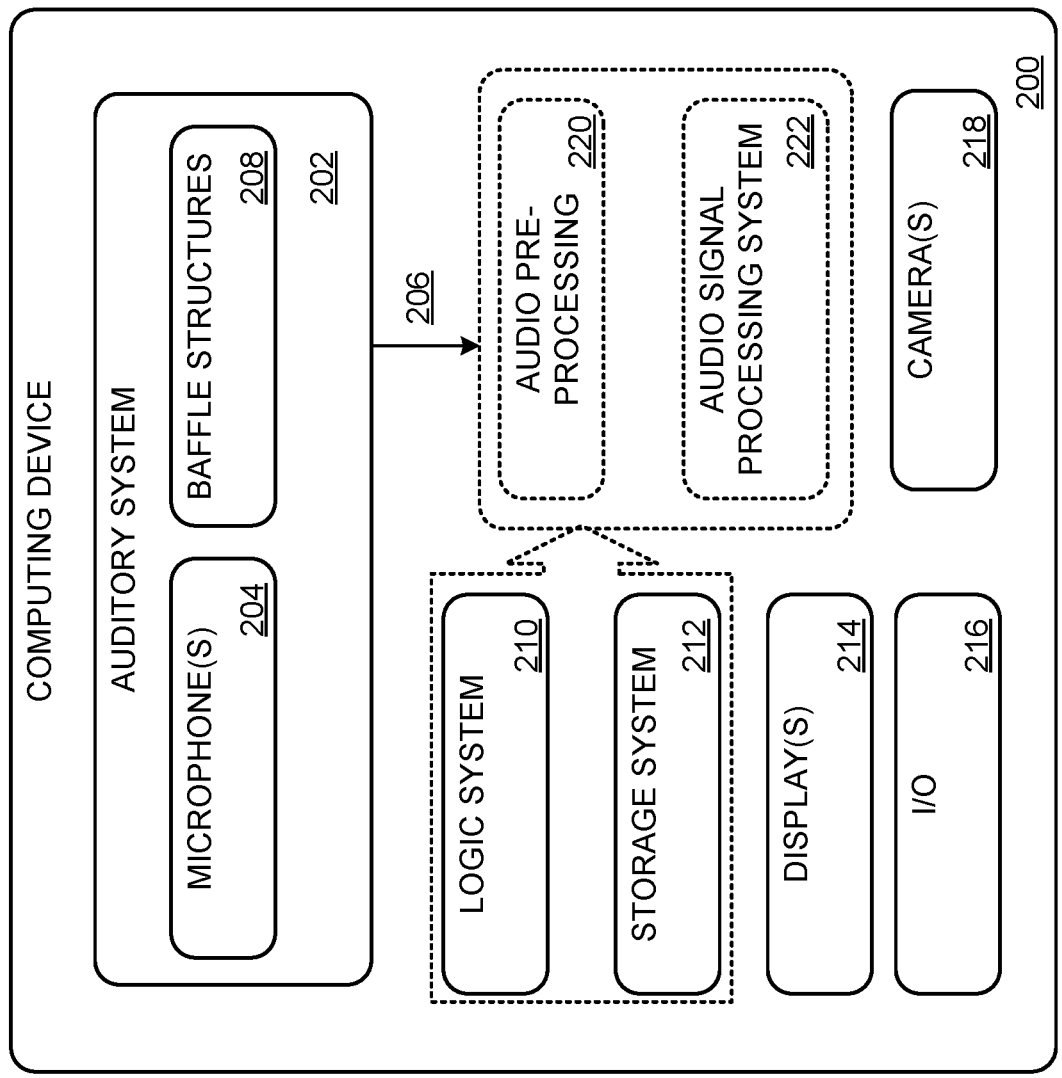
FIG. 2 schematically shows an example computing device comprising microphones and accompanying baffle structures.

FIG. 2 schematically shows an example computing device 200 that may be used to identify an angle of arrival for sonic waveforms in an environment. In particular, computing device 200 comprises an auditory system 202 exposed to an environment. Auditory system 202 comprises one or more microphones 204. Each microphone 204 is configured to receive sonic waveforms from the environment and to output audio signals 206. For example, each microphone may be configured to directionally record sound and convert the audible sound into a computer-readable audio signal 206. Microphones 204 may capture sound from all directions (e.g., be omni-directional) or may capture sounds from one or more directions preferentially (e.g., be directional). Microphones 204 may be cardioid, supercardioid, hypercardioid, or have any suitable listening pattern.

Each microphone may be associated with a baffle structure 208. Each baffle structure 208 is located sonically between the associated microphone and the environment. Example baffle structures are described herein and with regard to FIGS. 3A, 3B, and 4. Each baffle structure 208 comprises multiple paths for every arriving sonic waveform. The baffle structure 208 is configured to, based at least on an actual angle of arrival for a first sonic waveform, induce frequency dependent amplitude differences and frequency dependent phase differences for the sonic waveform over a range of frequencies of interest. In other words, baffle structure 208 is configured to cause phase and frequency variations to the original sonic waveform that depend on angle of arrival. The technical benefits of employing such a baffle structure include conveying unique characteristics to sonic waveforms based at least on their angle of arrival. This allows for sonic waveforms to be tagged and classified by their originating location.

Computing device 200 comprises a logic system 210 and a storage system 212. As shown in this example, computing device also includes a display 214, an i/o subsystem 216, and one or more cameras 218. Aspects of logic systems, storage systems, displays, and i/o subsystems are described further herein and with regard to FIG. 11. Cameras 218 may include color cameras, such as color (RGB) cameras, depth cameras, such as an infrared time-of-flight depth cameras with an associated infrared illuminator. In another example, the depth camera may comprise an infrared structured light depth camera and associated infrared illuminator.

Computing device 200 may take the form of one or more stand-alone computers, Internet of Things (IoT) appliances, personal computers, tablet computers, home-entertainment computers, network computing devices, gaming devices, mobile computing devices, mobile communication devices (e.g., smart phone), and/or other computing devices in other implementations. In general, the methods and processes described herein may be adapted to a variety of different computing systems having a variety of different microphone and/or baffle structure configurations.

Logic system 210 and storage system 212 may substantiate audio pre-processing 220 and an audio signal processing system 222. Audio pre-processing 220 may be communicatively coupled to microphones 204, and may receive raw audio signals from the microphones 204. Pre-processed audio signals may be passed to audio signal processing system 222. Audio signal processing system 222 may be employed as a sound source localization (SSL) machine configured to estimate the location(s) of sound(s) based at least on signals received from audio pre-processing 220.

Audio pre-processing 220 may perform numerous operations on audio signals received from microphones 204. The types of pre-processing operations may include analog-to-digital conversion (ADC), characteristic vector extraction, buffering, noise removal, signal combining and so forth.

Audio pre-processing 220 may act to amplify some signals and attenuate other signals. The attenuation may include fully canceling some signals in some examples. The audio pre-processing may include adjusting the phase of one or more of the signals output by the microphones. By adjusting the phase of the one or more signals, interference with the one or more signals may occur, attenuating the one or more signals. Audio pre-processing 220 may additionally or alternatively adjust the amplitude of one or more signals output by microphones 204. The amplitude adjustment may act to amplify or attenuate a particular signal. Audio pre-processing 220 may additionally or alternatively include applying a filter to the one or more signals output by microphones 204. A low-pass filter, high-pass filter, or other suitable filter may be used.

The audio signal processing system 222 may produce an output signal that represents a single audio source with as high SNR as possible. As an example, while multiple microphones may respectively produce signals in response to the same sound, a first signal may have a measurably greater amplitude than a second signal if the recorded sound originated in front of a first microphone. Similarly, the first signal may be phase shifted behind the second signal due to the longer time of flight (ToF) of the sound to the first microphone. Audio signal processing system 222 may use the amplitude, phase difference, and/or other parameters of the signals to estimate the angle of arrival of a sound. The technical benefits of determining an angle of arrival of a sound include assigning sounds (e.g., speech) to locations (e.g., talkers) in an environment. This may be accomplished with merely a pair of microphones, reducing costs and size of auditory systems as compared to bulky microphone arrays.

Audio signal processing system 222 may be configured to implement any suitable two- or three-dimensional location algorithms, including but not limited to previously-trained artificial neural networks, maximum likelihood algorithms, multiple signal classification algorithms, and cross-power spectrum phase analysis algorithms. Depending on the algorithm(s) used in a particular application, audio signal processing system 222 may output an angle, vector, coordinate, and/or other parameter estimating the origination of a sound. Such output—an angle, vector, coordinate, etc.—and/or one or more parameters of audio signals 206 described above—amplitude, phase difference, etc.—may be referred to as "location information," and may be used to establish a voiceprint of a human talker—e.g., by helping localize where utterances are made and thus the talker from which they originate.

Audio signal processing system 222 can have an algorithm based on classical linear signal processing or it could employ a neural network algorithm which can be trained on the system such that it is able to selectively discriminate sounds arriving from specific directions with respect to other sounds in the environment.

As non-limiting examples, audio signal processing system 222 may implement one or more of SSL, beamforming, voice identification, and/or speech recognition algorithms. For example, the audio data stream may be passed through a voice activity detection (VAD) stage configured to determine whether the audio data stream is representative of a human voice or other background noise. Audio data indicated as including voice activity may be output from the VAD stage and fed into a speech recognition stage configured to detect parts of speech from the voice activity. The speech recognition stage may output human speech segments. For example, the human speech segments may include parts of words and/or full words.

Audio signal processing system 222 may be trained with data labelled with angle of arrival, with the goal of training to infer the angle of arrival of a sound source and/or to increase the signal-to-noise ratio of an audio source, such as a human talking, in the presence of background noise. Such spatial decoding data can be combined with processing for speech recognition.

Audio signal processing system 222 may employ any suitable combination of state-of-the-art and/or future machine learning (ML) and/or artificial intelligence (AI) techniques. Non-limiting examples of techniques that may be incorporated in an implementation of audio signal processing system 222 include support vector machines, multi-layer neural networks, convolutional neural networks, recurrent neural networks, associative memories, unsupervised spatial and/or clustering methods, and/or graphical models.

In some examples, the methods and processes utilized by audio signal processing system 222 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of the audio signal processing system 222.

Non-limiting examples of training procedures for audio signal processing system 222 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. In some examples, a plurality of components of audio signal processing system 222 may be trained simultaneously with regard to an objective function measuring performance of collective functioning of the plurality of components (e.g., with regard to reinforcement feedback and/or with regard to labelled training data), in order to improve such collective functioning. In some examples, one or more components of audio signal processing system 222 may be trained independently of other components (e.g., offline training on historical data). For example, audio signal processing system 222 may be trained via supervised training on labelled training data comprising sonic waveforms with labels indicating locations relative to microphones, and with regard to an objective function measuring an accuracy, precision, and/or recall of positioning audio sources by audio signal processing system 222 as compared to actual locations of audio sources indicated in the labelled training data.

In some examples, audio signal processing system 222 may employ a convolutional neural network configured to convolve inputs with one or more predefined, randomized and/or learned convolutional kernels. By convolving the convolutional kernels with an input vector, the convolutional neural network may detect a feature associated with the convolutional kernel. For example, a convolutional kernel may be convolved with an input sonic waveform to detect low-level audio features such as peaks, phases, etc., based on various convolution operations with a plurality of different convolutional kernels. Convolved outputs of the various convolution operations may be processed by a pooling layer (e.g., max pooling) which may detect one or more most salient features of the input sonic waveform and/or aggregate salient features of the input sonic waveform, in order to associate salient features of the sonic waveform with particular locations in the environment. Pooled outputs of the pooling layer may be further processed by further convolutional layers. Convolutional kernels of further convolutional layers may recognize higher-level sonic features, and more generally spatial arrangements of lower-level sonic features. Accordingly, the convolutional neural network may recognize and locate audio sources in the input sonic waveform. Although the foregoing example is described with regard to a convolutional neural network, other neural network techniques may be able to detect and/or locate audio sources and other salient features based at least on detecting low-level sonic features, higher-level sonic features, and spatial arrangements of sonic features.

Microphones 204 are located sonically downstream of the convoluted baffle structures 208. Baffle structures 208 comprises rigid materials that are reflective of the frequencies of interest. Baffle structures 208 are preferably not absorptive or transparent to the frequencies of interest. However, in some specialized examples, baffle structures 208 could have a mix of absorption and reflection across frequency spectrum. Example materials include metal, ceramic, and hard plastics. Baffle structures 208 may be generated via 3D printing, for example. By placing rigid baffle structures 208 in a known configuration, audio signal processing system 222 can be trained to associate a direction of arrival with a particular stimulus pair.

Baffle structures 208 may be small (e.g., 5 cm) as to be included in a laptop or tablet computer. The baffle structures can impart enhanced sonic discrimination, an increased range for picking up speech, and the ability to determine whether an audio source was close or far away. The size of baffle structure 208 may trend with the desired frequency range, e.g., a larger baffle structure may have increased performance for lower frequencies and vice versa. For example the occlusion effect of the baffle structures is highly frequency dependent, and thus dependent on the size of the baffle structure. As such, baffle structures 208 may be optimized for a range of frequencies of interest, for example the range of human speech between 100 Hz and 17 kHz.

Figure 3A:
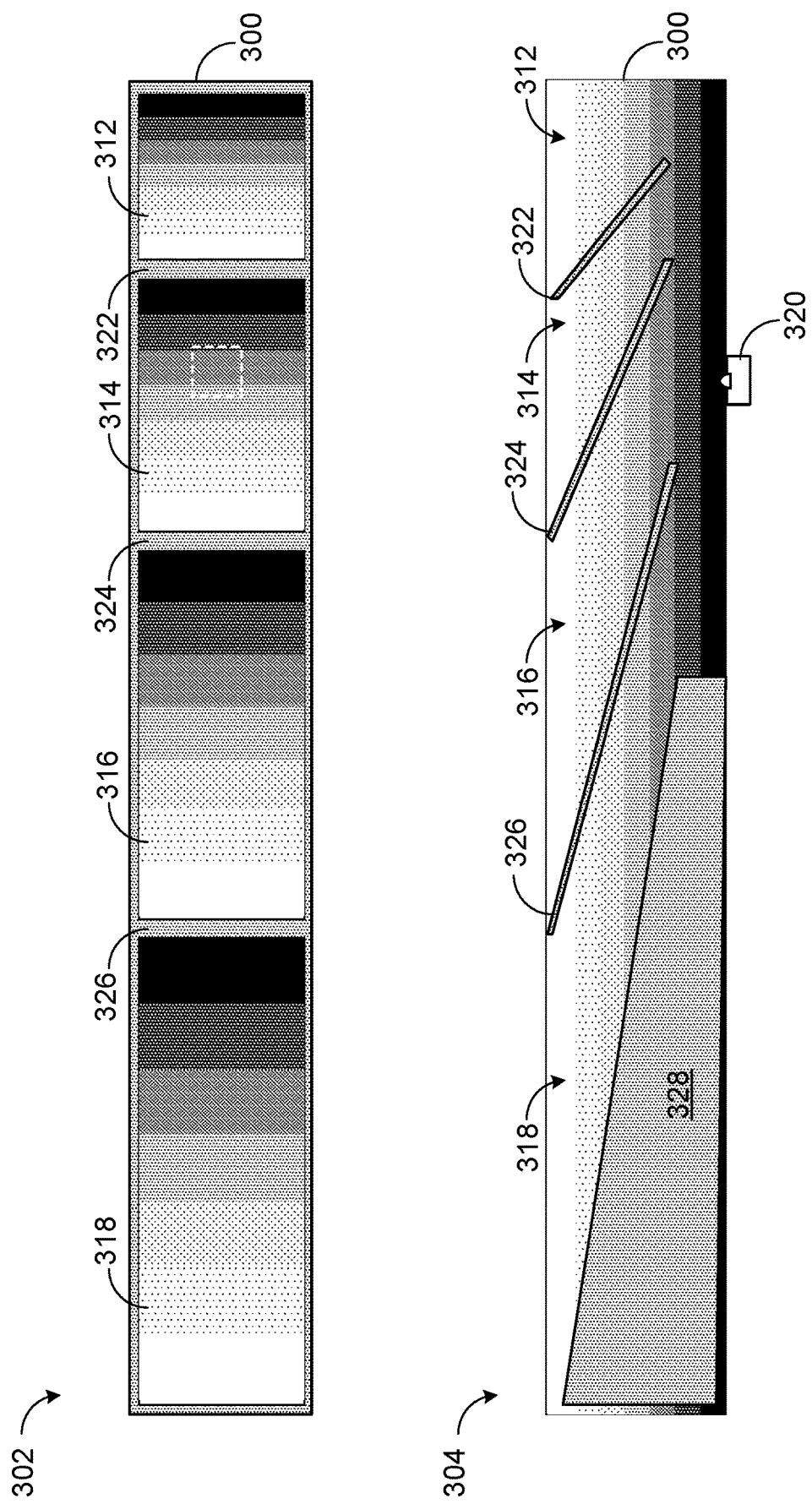
FIG. 3A shows an example baffle structure for inducing frequency dependent amplitude and phase differences at a microphone.

FIG. 3A shows an example baffle structure 300. At 302, baffle structure 300 is shown from the perspective of an acoustic environment. At 304, baffle structure 300 is shown in a cutaway side-view. In this example, baffle structure 300 comprises four rectangular convoluted openings (312, 314, 316, 318) of increasing size. Microphone 320 is positioned at the base of baffle structure 300 beneath opening 314. More or fewer convoluted openings may be included in other examples. Microphone 320 may be placed at different locations at the base of baffle structure 300 depending on application and frequency range of interest. Convoluted openings 312-318 are generated between baffles 322, 324, 326, and 328. Each baffle is positioned at a unique angle to microphone 320, generating a series of unique pathways that sonic waveforms may traverse between the environment and microphone 320. This generates a structure that has asymmetry of phase, amplitude, and frequency.

Convoluted openings 312-318 are designed so that sonic waveforms follow the pathways of baffle structure 300 and reconvene at microphone 310. One of the functions of baffle structure 300 is thus to change the path length for one sonic waveform as compared to another sonic waveform that emanates from the same sound source in a frequency dependent manner. At microphone 320, the sonic waveforms can constructively or destructively interfere with each other. This induces scattering or spatial diversity in the sonic waveform and subsequent microphone output. Some frequencies, such as higher frequencies may be completely occluded by baffles 322, 324, 326, and 328. As baffle structure 300 comprises a continuous air mass, sonic waveforms will reverberate around or diffract around into the structure before reaching microphone 320.

The convoluted openings 312-318 may act to smear the time of arrival across microphone 320. However, the convolutions also add frequency dependent amplitude changes that combine with the constructive and destructive interference. In some examples, microphone 320 may have a clear path line to the audio source through one or more of the convoluted openings. In such an example, there will be no occlusion across any frequencies for that audio source, but there will be delayed, attenuated, and/or occluded signals arriving through other convoluted openings that are superimposed on the sonic waveform. The sonic waveform is thus scattered in a deliberate way by baffle structure 300 to effectively perform frequency-based tagging that can be traced to the angle of arrival of the sonic waveform.

Figure 3B:
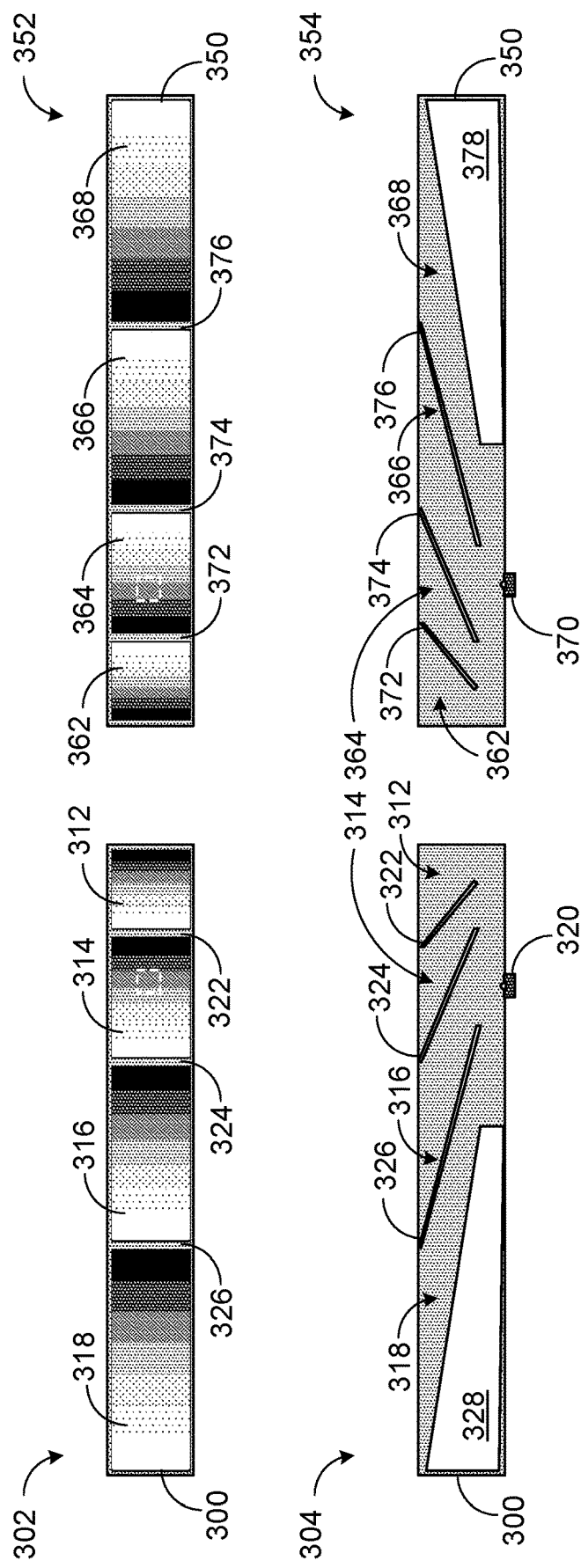
FIG. 3B shows a binaural pair of the baffle structure of FIG. 3A.

Baffle structures such as baffle structure 300 are thus sufficient to discern angle of arrival for incoming conic waveforms. Additional sonic information may be derived by employing a binaural pair of microphones and baffle structures. FIG. 3B shows baffle structure 300 paired with baffle structure 350. In this example, baffle structure 350 is constructed as a mirror image of baffle structure 300. Baffle structure 350 is shown from the perspective of an acoustic environment at 352, and in a cutaway side view at 354. Baffle structure 350 comprises four rectangular convoluted openings (362, 364, 366, 368) of increasing size. Microphone 370 is positioned at the base of baffle structure 300 beneath opening 364. Convoluted openings 362-368 are generated between baffles 372, 374, 376, and 378.

Baffle structure 300 and microphone 320 have left/right asymmetry with baffle structure 350 and microphone 370. In this example, baffle structure 350 is mirrored from baffle structure 300, but in other examples, the two baffle structures may be completely asymmetric. Some degree of symmetry may have the technical benefit of simplifying downstream audio processing, as the two microphones will receive similar patterns of occlusion and frequency dependent interference, though microphone 320 and microphone 370 will receive different sonic waveforms for any given audio source.

The technical benefits of this asymmetry include that the two microphones will receive different signals based on the angle of arrival of each sonic waveform. Imparting different spatial frequency responses to each microphone serves to increase SNR and helps determine angle of arrival. With two microphones, the time differences allow for estimating distance to the audio source and may also contribute to determining the angle of arrival.

Baffle structures 300 and 350 induce phase & amplitude differences between the two microphones that are unique with respect to the angle of arrival of the sound signal. The baffle structures achieve that by causing the incoming sonic waveform to follow a different path to each microphone for different angles of arrival.

In some examples, multiple microphones can be located at differing positions within a single baffle structure to increase resolution. Additional microphones, whether associated with additional baffle structures or not, can increase angular discrimination accuracy.

Microphone 320 is located at a known distance from microphone 370. In some examples, this distance may be fixed. In other examples, this distance may be adjustable, e.g., based at least on environmental characteristics, audio characteristics, etc. While time of arrival is smeared somewhat across the convolutions of a single baffle structure, the spacing between the two microphones informs time of arrival and mitigates this problem.

By inducing frequency-based differences in amplitude, phase, etc., binaural baffled microphone structures generate significantly more information than traditional, un-baffled microphone arrays. This allows for more discrete and accurate estimation of the angle of arrival.

Figure 4:
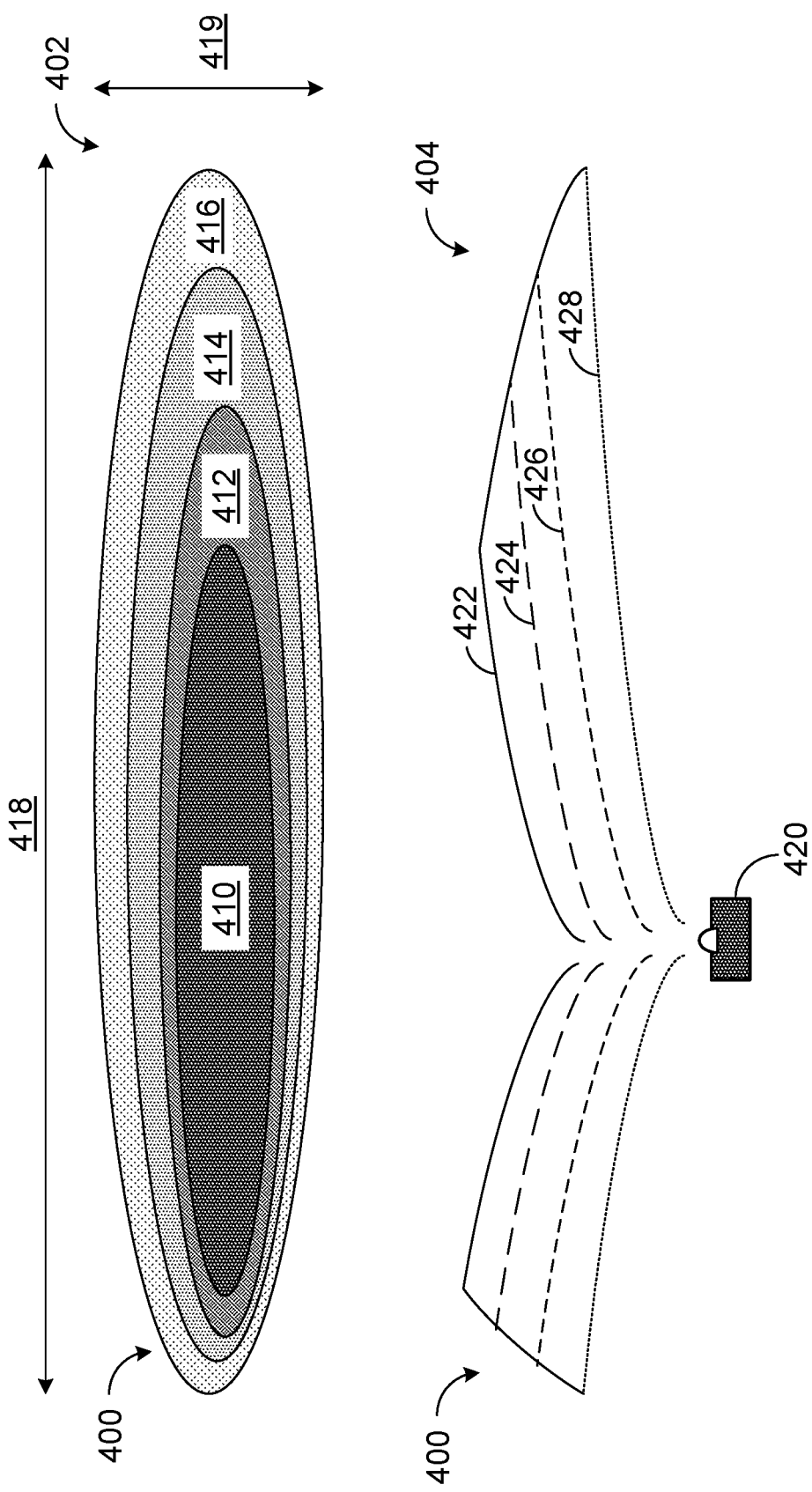
FIG. 4 shows an additional example baffle structure for inducing frequency dependent amplitude and phase differences at a microphone.

FIG. 4 shows an alternate configuration for a baffle structure 400. At 402, baffle structure 400 is shown from the perspective of an acoustic environment. At 404, baffle structure 400 is shown in a cutaway side-view. Baffle structure 400 is deposed as a nested conical structure. Four conical openings (410, 412, 414, and 416) are shown, but more or fewer may be included. Baffle structure 400 is asymmetric along both the X axis (418) and the Y axis (419). Microphone 420 is positioned at the base of the conical openings. Conical openings 412-418 are generated between baffles 422, 424, 426, and 428.

In this example, cones 410-416 have elliptical openings facing the environment. In other examples, the cones may have rectangular or other shaped openings. As shown from the side perspective at 404, the cones form a concentric horn structure akin to a horn loudspeaker.

By skewing the cones in both the X and Y direction, the received audio signals exhibit frequency-based differences of arrival based at least on angle of arrival in both X and Y dimensions. Other examples may feature more complex baffles that are configured in a 3-dimensional structure that is asymmetric in the X, Y, and Z dimensions. For example, a spherical baffle may have a tetrahedral arrangement of four microphones within the baffle. Such an arrangement may act as a sort of minimal spanning set for a 3-dimensional series of points and have the ability to discriminate across the entire sphere. Baffle structure configurations may be generated in a simulated environment, with a tradeoff made between the simplest mechanical baffle structures and the structures that provide the simplest computational problems.

Figure 5A:
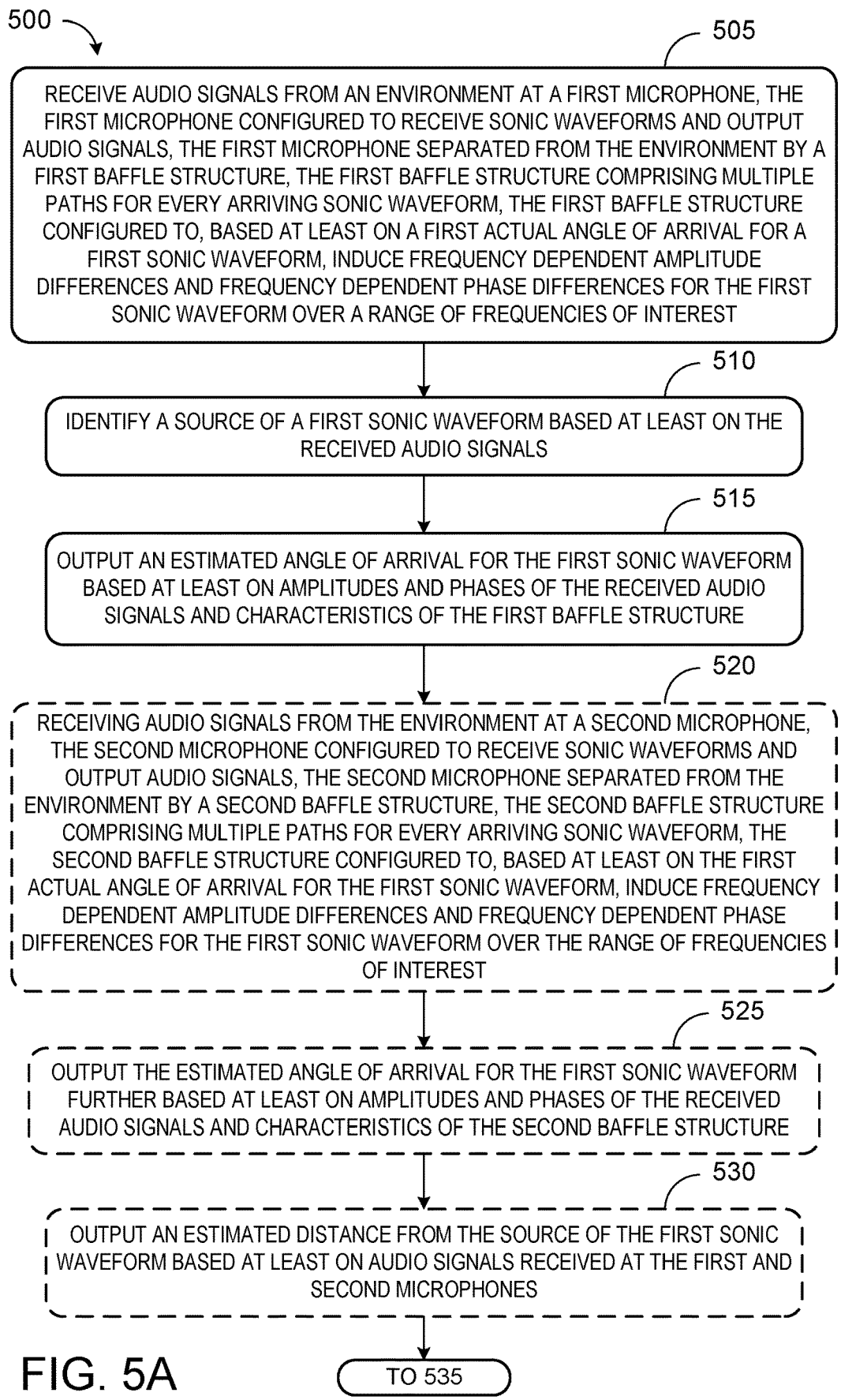
FIGS. 5A and 5B show a flow diagram for determining an angle of arrival for a sonic waveform.
Figure 5B:
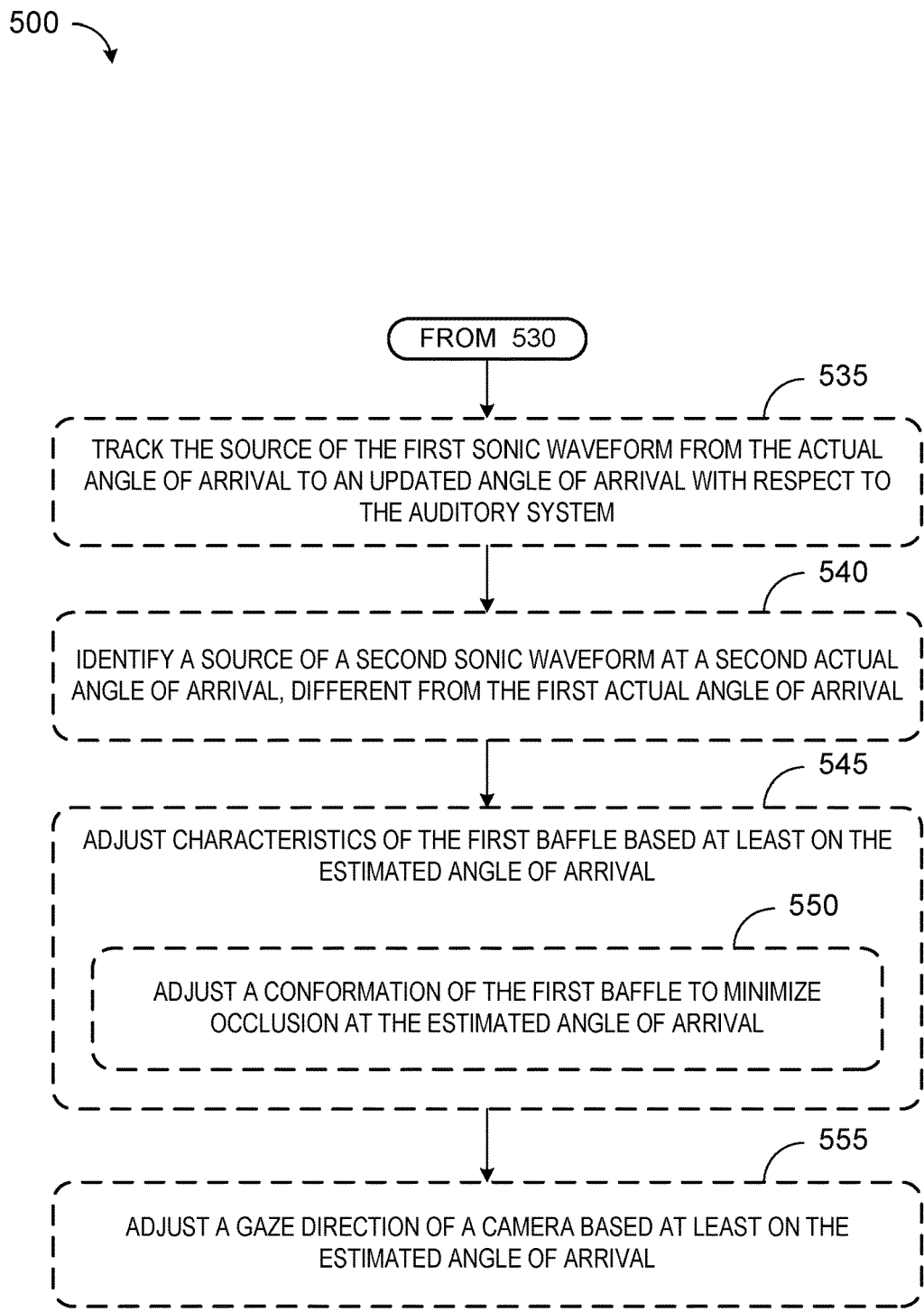

FIGS. 5A and 5B show a flow-diagram for an example method 500 for determining an angle of arrival for a sonic waveform. Method 500 may be executed by a computing device, such as computing device 200, that comprises one or more microphones, each microphone sonically coupled to the environment via a baffle structure, such as baffle structures 300 or 400.

At 505, method 500 comprises receiving audio signals from an environment at a first microphone, the first microphone configured to receive sonic waveforms and output audio signals, the first microphone separated from the environment by a first baffle structure, the first baffle structure comprising multiple paths for every arriving sonic waveform, the first baffle structure configured to, based at least on a first actual angle of arrival for a first sonic waveform, induce frequency dependent amplitude differences and frequency dependent phase differences for the first sonic waveform over a range of frequencies of interest. In other words, the baffle structure imparts variation in the phases and amplitude of the sonic waveform based at least on the angle of arrival. In some examples, the range of frequencies of interest comprise 100 Hz to 17 kHz (e.g., the range of human speech).

At 510, method 500 includes identifying a source of a first sonic waveform based at least on the received audio signals. In some examples, identifying the source of the first sonic waveform may include identifying that the source is human, e.g., via speech recognition. In some examples, identifying that the source is human may include identifying a particular human that is the source of the first sonic waveforms (e.g., via voice recognition). At 515, method 500 includes outputting an estimated angle of arrival for the first sonic waveform based at least on amplitudes and phases of the received audio signals and characteristics of the first baffle structure.

Figure 6:
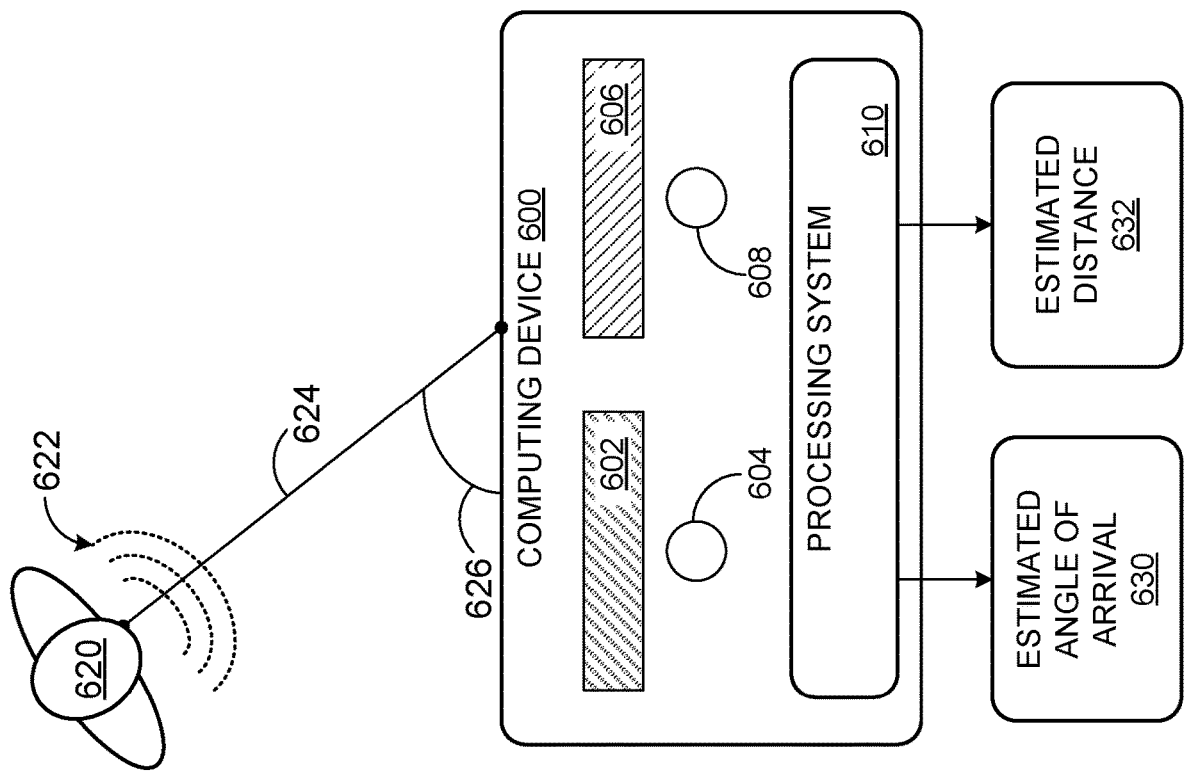
FIG. 6 shows an example scenario for an environment comprising an auditory system and a single source of a sonic waveform.

As an example, FIG. 6 shows an example scenario for an environment comprising an auditory system and a single source of a sonic waveform. FIG. 6 schematically shows a computing device 600. Computing device 600 comprises a first baffle structure 602 associated with a first microphone 604. Computing device 600 further comprises a second baffle structure 606 associated with a second microphone 608. A processing system 610 receives audio signals output from microphones 604 and 608. A user 620 is a source of first sonic waveform 622. User 620 is located at a position having a distance 624 from computing device 600 and oriented such that first sonic waveform 622 addresses computing device 600 at actual angle of arrival 626.

In one example, first sonic waveform 622 may be received by microphone 604 via baffle structure 602. Processing system 610 may receive an audio signal from microphone 604 and determine an estimated angle of arrival 630. Additionally or alternatively, first sonic waveform 622 may be received by microphone 608 via baffle structure 606. Processing system 610 may receive an audio signal from microphone 608 and determine estimated angle of arrival 630. Estimated angle of arrival 630 may be an estimate of actual angle of arrival 626.

Returning to FIG. 5, optionally, at 520, method 500 comprises receiving audio signals from the environment at a second microphone, the second microphone configured to receive sonic waveforms and output audio signals, the second microphone separated from the environment by a second baffle structure, the second baffle structure comprising multiple paths for every arriving sonic waveform, the second baffle structure configured to, based at least on the first actual angle of arrival for the first sonic waveform, induce frequency dependent amplitude differences and frequency dependent phase differences for the first sonic waveform over the range of frequencies of interest. In other words, the baffle structure imparts variation in the phases and amplitude of the sonic waveform based at least on the angle of arrival.

Optionally, at 525, method 500 comprises outputting the estimated angle of arrival for the first sonic waveform further based at least on amplitudes and phases of the received audio signals and characteristics of the second baffle structure. Optionally, at 530, method 500 comprises outputting an estimated distance from the source of the first sonic waveform based at least on audio signals received at the first and second microphones. In some examples, a direct-to-reverberant energy ratio (DRR) for an audio signal may be determined by any suitable means such as by computing the ratio of the energy contained in the direct acoustic path through the air from the source of the first sonic waveform to the first and second microphones via the baffle structure to the energy contained in the diffuse field that arrives later and has no directionality. The DRR may be used to determine the estimated distance from the source of the first sonic waveform. DRR may be a function of environmental (e.g., room) characteristics, directivities of the source of the first sonic waveform and the first and second microphones, and the distance from the source of the first sonic waveform.

Returning to the example of FIG. 6, processing system 610 may receive audio signals from both microphones 604 and 608 and output estimated angle of arrival 630 based at least on the audio signals received from both microphones. Processing system 610 may further output an estimated distance 632 based at least on the audio signals received from first microphone 604 and second microphone 608. Estimated distance 632 may be an estimate of distance 624.

Turning to FIG. 5B, optionally, at 535, method 500 comprises tracking the source of the first sonic waveform from the actual angle of arrival to an updated angle of arrival with respect to the auditory system. In other words, once a source of a sonic waveform has been identified, the source may move within the environment and the sonic waveforms emanating from the source may be tracked and labeled as output by the same source.

Figure 7B:
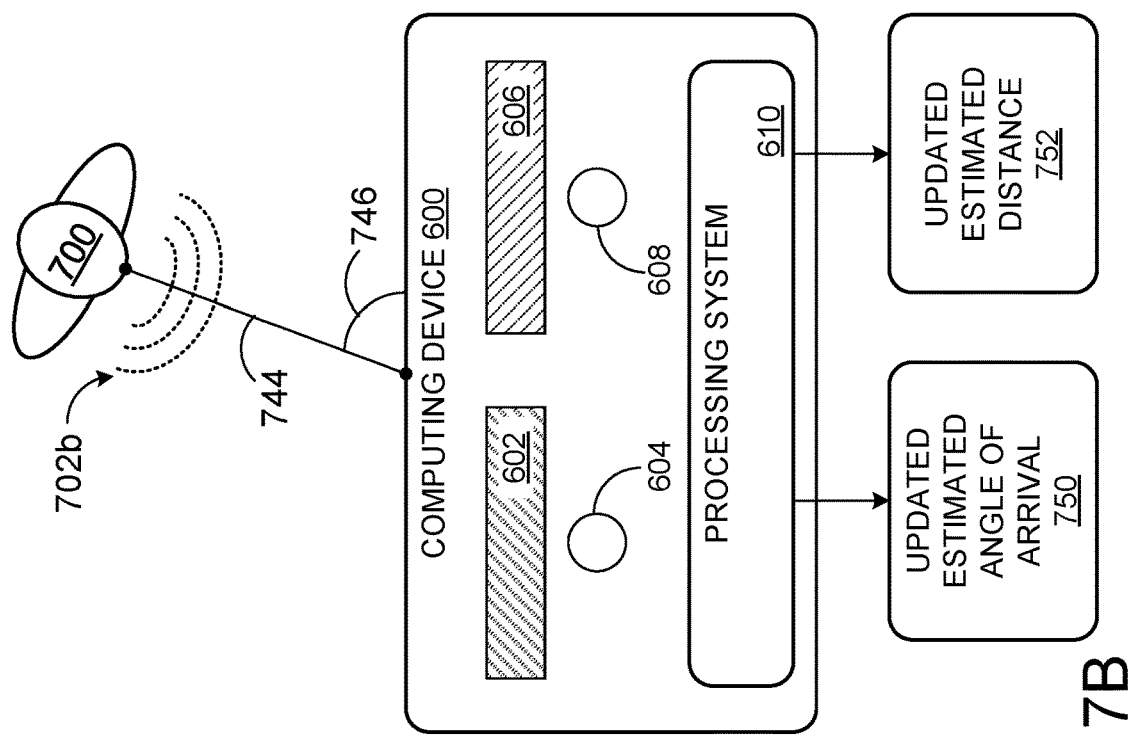
FIGS. 7A and 7B show an example scenario for an environment comprising an auditory system and a moving source of a sonic waveform.
Figure 7A:
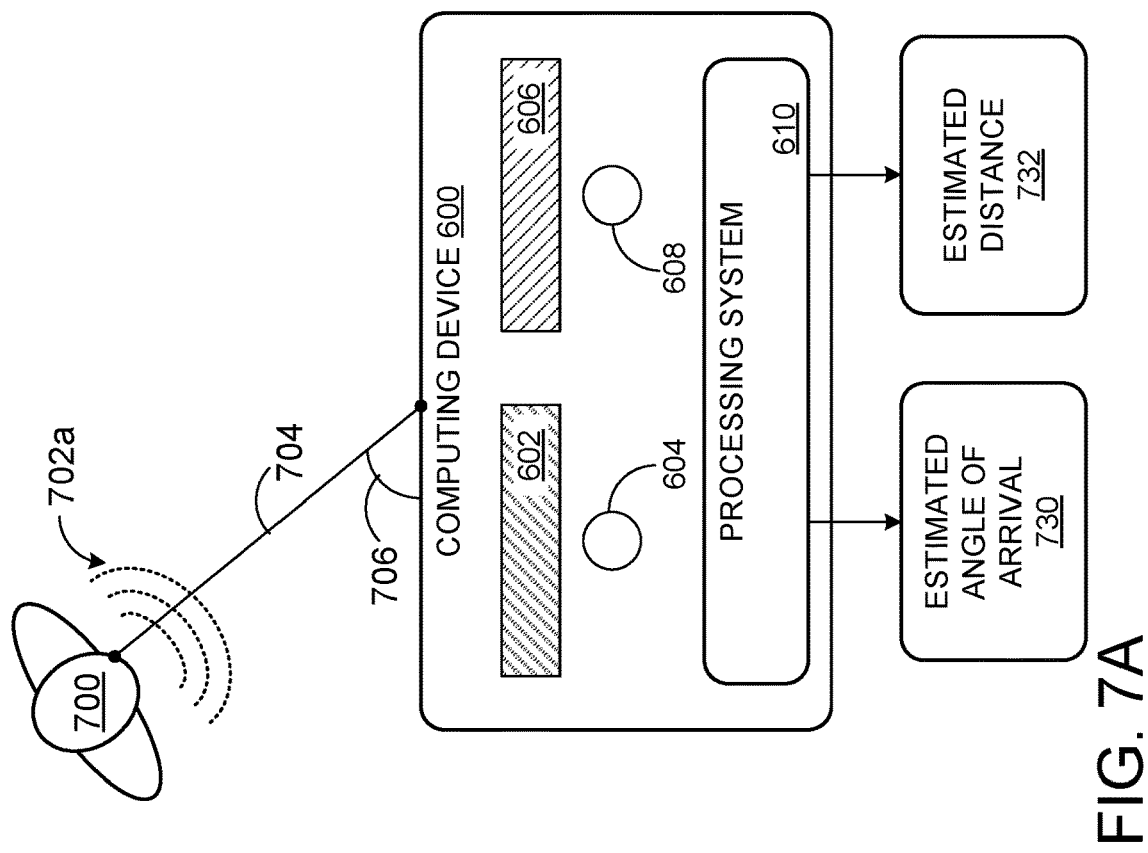

For example, FIGS. 7A and 7B show an example scenario for an environment comprising an auditory system and a moving source of a sonic waveform. In FIG. 7A, user 700 is a source of a first sonic waveform 702a. User 700 is located at a position having a distance 704 from computing device 600 and oriented such that first sonic waveform 702a addresses computing device 600 at actual angle of arrival 706.

In one example, first sonic waveform 702a may be received by first microphone 604 via first baffle structure 602 and by second microphone 608 via second baffle structure 606. Processing system 610 may receive audio signals from first microphone 604 and second microphone 608 and determine an estimated angle of arrival 730 and an estimated distance 732. Estimated angle of arrival 730 may be an estimate of actual angle of arrival 706 and estimated distance 732 may be an estimate of distance 704.

In FIG. 7B, user 700 is a source of an updated first sonic waveform 702b. User 700 has moved to a position having a distance 744 from computing device 600 and oriented such that first sonic waveform 702a addresses computing device 600 at actual angle of arrival 746. Updated first sonic waveform 702b may be received by first microphone 604 via first baffle structure 602 and by second microphone 608 via second baffle structure 606. Processing system 610 may receive audio signals from first microphone 604 and second microphone 608 and determine an updated estimated angle of arrival 750 and an updated estimated distance 752. Updated estimated angle of arrival 750 may be an estimate of actual angle of arrival 746 and updated estimated distance 752 may be an estimate of distance 744.

Returning to FIG. 5B, optionally, at 540, method 500 comprises identifying a source of a second sonic waveform at a second actual angle of arrival, different from the first actual angle of arrival. In some examples, additional sources of additional sonic waveforms may be identified, and additional angles of arrival discerned.

Figure 8:
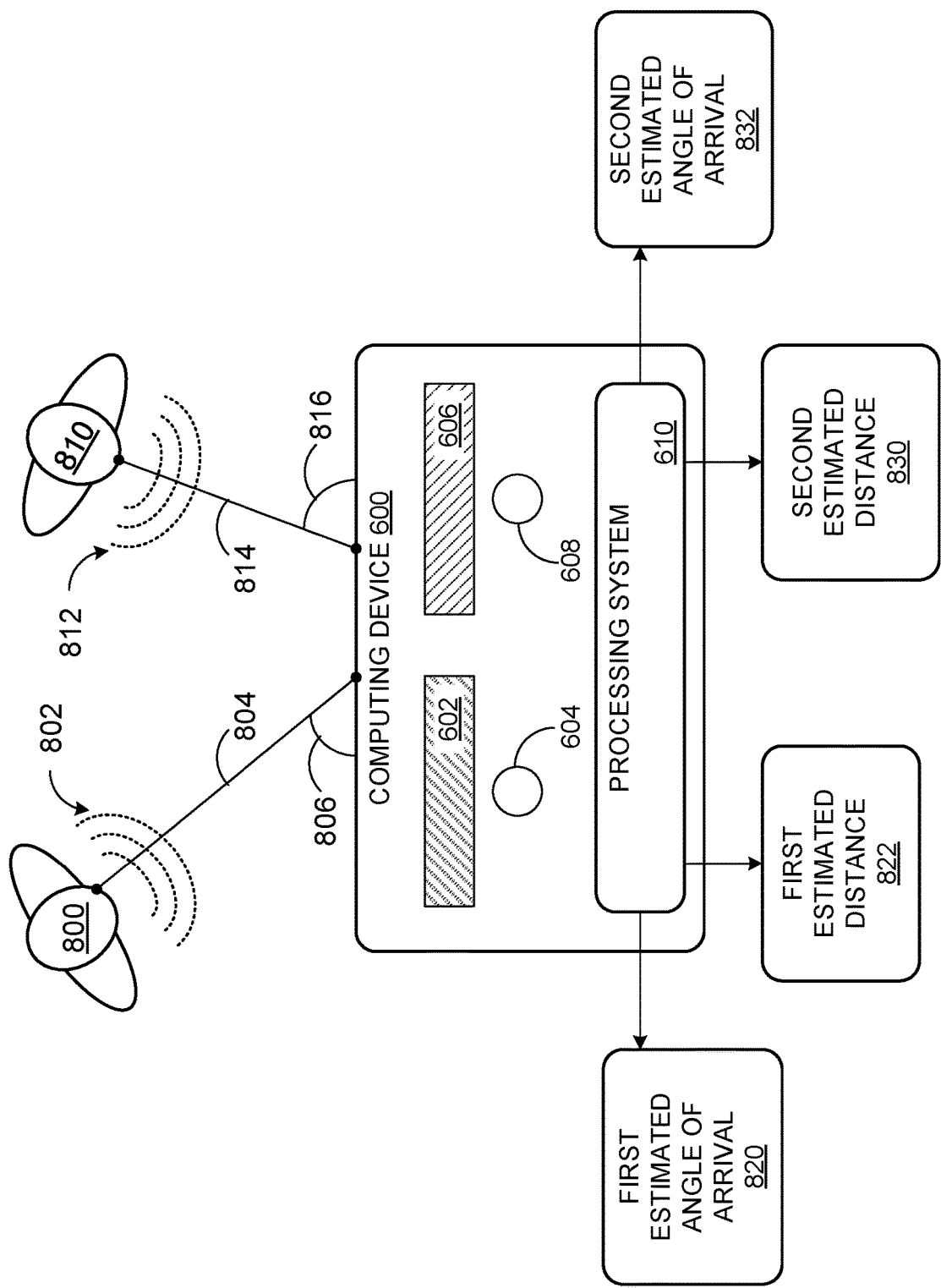
FIG. 8 shows an example scenario for an environment comprising an auditory system and multiple sources of sonic waveforms.

For example, FIG. 8 shows an example scenario for an environment comprising an auditory system and multiple sources of sonic waveforms. First user 800 is a source of a first sonic waveform 802. User 800 is located at a position having a distance 804 from computing device 600 and oriented such that first sonic waveform 802 addresses computing device 600 at actual angle of arrival 806. Second user 810 is a source of a second sonic waveform 812. User 810 is located at a position having a distance 814 from computing device 600 and oriented such that first sonic waveform 812 addresses computing device 600 at actual angle of arrival 816.

In this example, first sonic waveform 802 may be received by first microphone 604 via first baffle structure 602 and by second microphone 608 via second baffle structure 606. Concurrently, second sonic waveform 812 may be received by first microphone 604 via first baffle structure 602 and by second microphone 608 via second baffle structure 606.

Processing system 610 may receive audio signals from first microphone 604 and second microphone 608 and determine a first estimated angle of arrival 820 and a first estimated distance 822 for first sonic waveform 820. First estimated angle of arrival 820 may be an estimate of actual angle of arrival 806 and first estimated distance 822 may be an estimate of distance 804. Processing system 610 may also determine a second estimated angle of arrival 830 and a second estimated distance 832 for second sonic waveform 812. Second estimated angle of arrival 830 may be an estimate of actual angle of arrival 816 and second estimated distance 832 may be an estimate of distance 814.

In some examples, the baffle structure(s) may be adjustable between two or more conformations. Returning to FIG. 5B, optionally, at 545, method 500 comprises adjusting characteristics of the first baffle based at least on the estimated angle of arrival. For example, an actuator may be configured to mechanically adjust a position of one or more baffles in real time. As an example, one or more baffles may be coupled to a motorized actuator. The conformation of the baffle(s) may be further updated as a position of a sound source is updated. In some examples, the conformation of the baffle(s) is adjusted to change the baffle orientation in a horizontal plane. In some examples, the conformation of the baffle(s) is adjusted to change the baffle orientation in three dimensions. Where multiple baffles are included, a first baffle and a second baffle may be configured asymmetrically based at least on the estimated angle of arrival. In other words, the first and second baffles may undergo unique changes in conformation that are independent of the other baffle(s).

Optionally, at 550, method 500 comprises adjusting a conformation of the first baffle to minimize occlusion at the estimated angle of arrival. In some examples, the conformation of the first baffle is adjusted to maximize SNR for the sonic waveform. In scenarios where multiple sound sources are present in the environment, the conformation of the baffle(s) may be adjusted to maximize differences between the sonic waveforms. In some examples, the baffle(s) may be configured to be positioned at a default conformation in the absence of angle of arrival information, e.g., facing forward from the computing device. Upon detecting a sound source and estimating an angle of arrival to the side or rear of the device, the conformation may be adjusted.

Figure 9B:
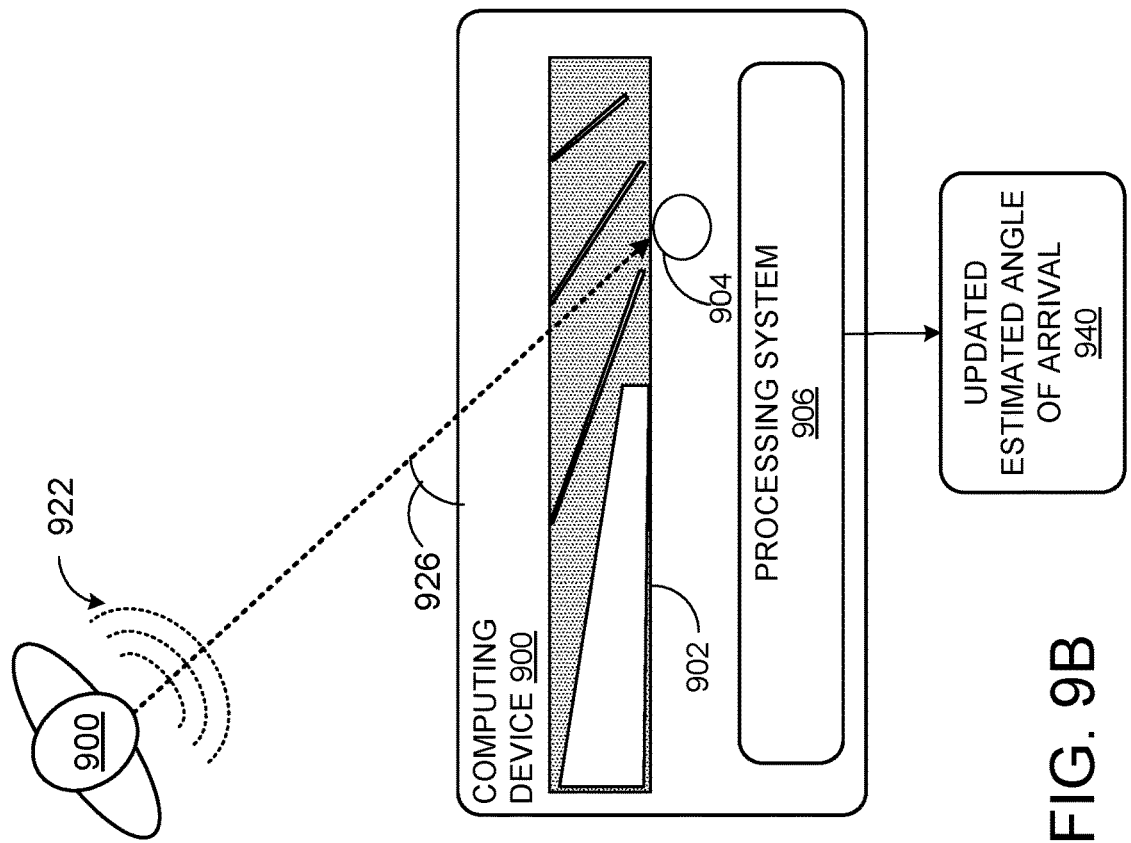
FIGS. 9A and 9B show an example auditory system comprising an adjustable baffle structure.
Figure 9A:
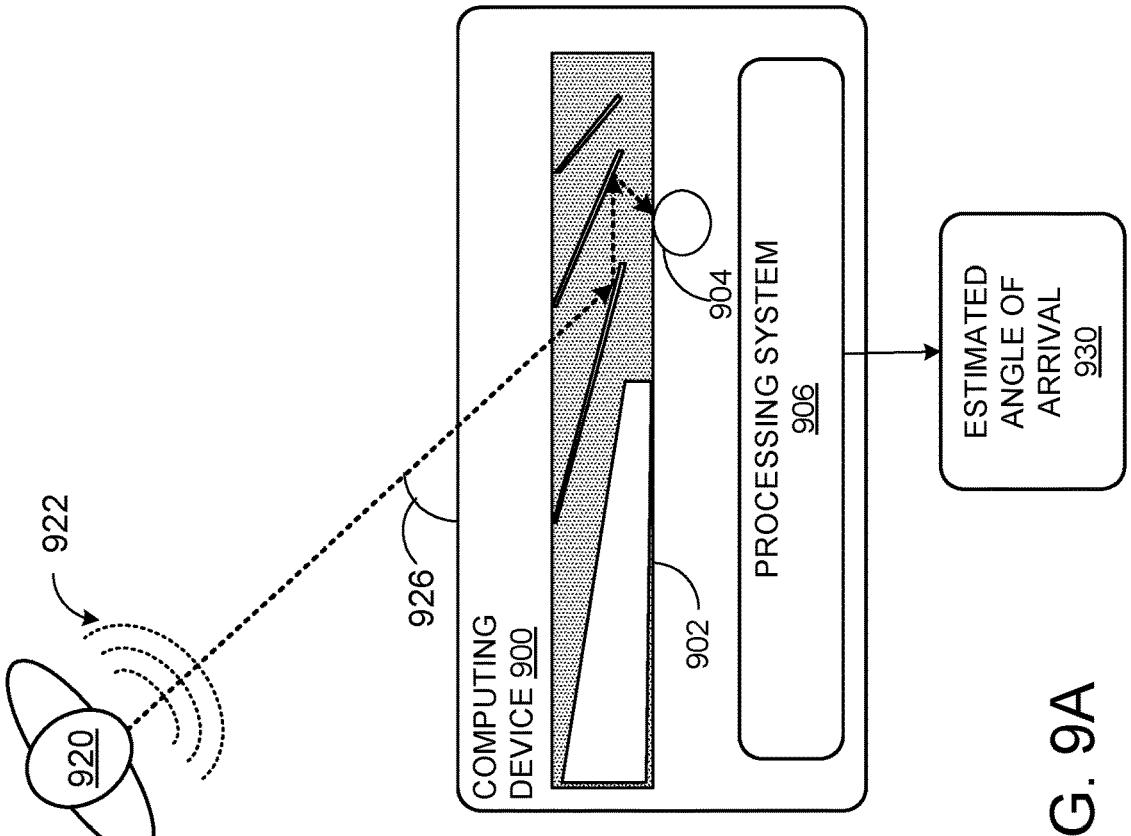

As an example, FIGS. 9A and 9B show an example auditory system comprising an adjustable baffle structure. FIGS. 9A and 9B schematically show a computing device 900. Computing device 900 comprises an adjustable baffle structure 902 associated with a microphone 904. A processing system 910 receives audio signals output from microphone 904. A user 920 is a source of first sonic waveform 922. User 920 is oriented such that first sonic waveform 922 addresses computing device 900 at actual angle of arrival 926.

In FIG. 9A, adjustable baffle structure 902 is in a first conformation. Sonic waveform 922 reflects off of baffles within adjustable baffle structure 902 before reaching microphone 904. Processing system 910 may receive an audio signal from microphone 904 and determine an estimated angle of arrival 930. Estimated angle of arrival 930 may be an estimate of actual angle of arrival 926.

Based at least on estimated angle of arrival 930, computing system 900 may adjust the conformation of adjustable baffle structure 902. In FIG. 9B, adjustable baffle structure 902 is in a second conformation. The second conformation reduces occlusion of sounds received at estimated angle of arrival 930 (e.g., sonic waveform 922). Sonic waveform 922 thus reaches microphone 904 without reflecting off of baffles within adjustable baffle structure 902. Processing system 910 may receive an audio signal from microphone 904 and determine an updated estimated angle of arrival 940. Updated estimated angle of arrival 940 may be an estimate of actual angle of arrival 926.

Returning to FIG. 5B, optionally, at 555, method 500 comprises adjusting a gaze direction of a camera based at least on the estimated angle of arrival. In turn, images from the camera may be used to inform the angle of arrival for a moving sound source in a feedback loop. For computing systems with adjustable baffles, information from the camera may be used to track the sound source and pre-emptively adjust the baffle conformation.

Figure 10B:
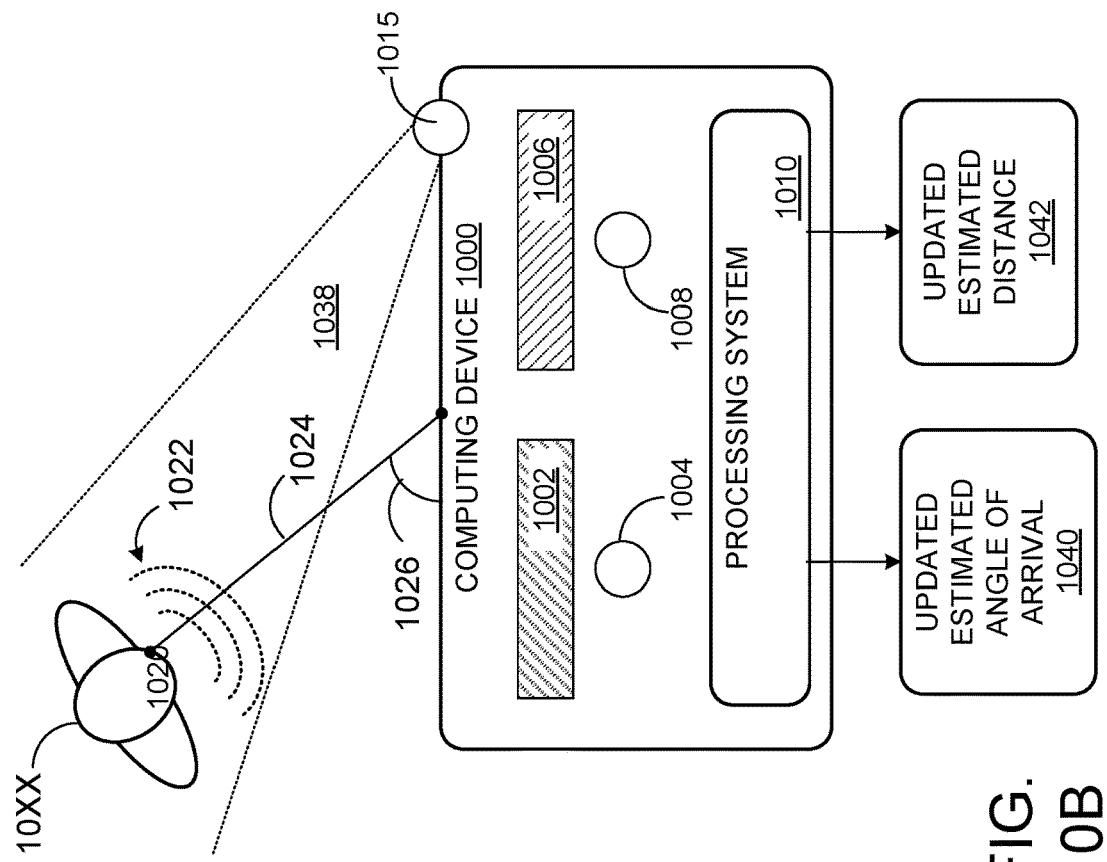
FIGS. 10A and 10B show an example scenario for a computing system comprising an auditory system and a camera.
Figure 10A:
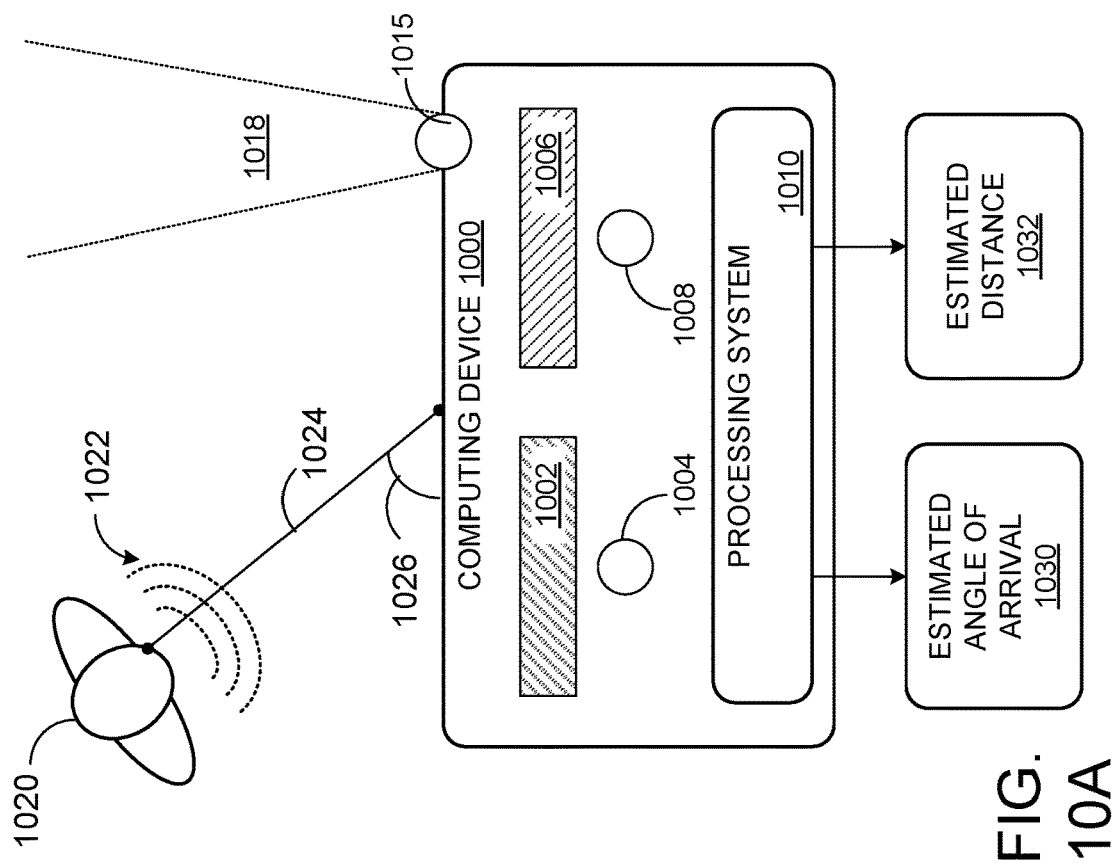

For example, FIGS. 10A and 10B show an example scenario for a computing system comprising an auditory system and a camera. FIG. 10 schematically shows a computing device 1000. Computing device 1000 comprises a first baffle structure 1002 associated with a first microphone 1004. Computing device 1000 further comprises a second baffle structure 1006 associated with a second microphone 1008. A processing system 1010 receives audio signals output from microphones 1004 and 1008. Computing device 1000 further comprises camera 1015. In FIG. 10A, camera 1015 is configured with a gaze direction 1018.

A user 1020 is a source of first sonic waveform 1022. User 1020 is located at a position having a distance 1024 from computing device 1000 and oriented such that first sonic waveform 1022 addresses computing device 1000 at actual angle of arrival 1026. In FIG. 10A, user 1020 is outside the gaze direction 1018 of camera 1015.

In one example, first sonic waveform 1022 may be received by first microphone 1004 via first baffle structure 1002 and by second microphone 1008 via second baffle structure 1006. Processing system 1010 may receive audio signals from first microphone 1004 and second microphone 1008 and determine an estimated angle of arrival 1030 and an estimated distance 1032. Estimated angle of arrival 1030 may be an estimate of actual angle of arrival 1006 and estimated distance 1032 may be an estimate of distance 1004.

Based at least on the estimated angle of arrival 1030, computing device 1000 may adjust an orientation of camera 1015. As shown in FIG. 10B, camera 1015 is adjusted to an orientation with gaze direction 1038. User 1020 is positioned within gaze direction 1038. As such, imagery from camera 1015 may be used to generate an updated estimated angle of arrival 1040 and an updated estimated distance 1042.

The computing systems herein comprising baffle structures thus provide numerous advantages over current auditory systems, such as microphone arrays. The systems disclosed herein have increased spatial discrimination, increased noise rejection, increased signal-to-noise ratio, and enhanced reverberation rejection. The number of microphone elements may be reduced to two, or in some cases, as few as one. This enables a more compact system design that can be incorporated into smaller devices, such as laptops and tablets. Finally, the baffle design can enable leverage of new hardware accelerators for machine learning and neural network processing of audio signals.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
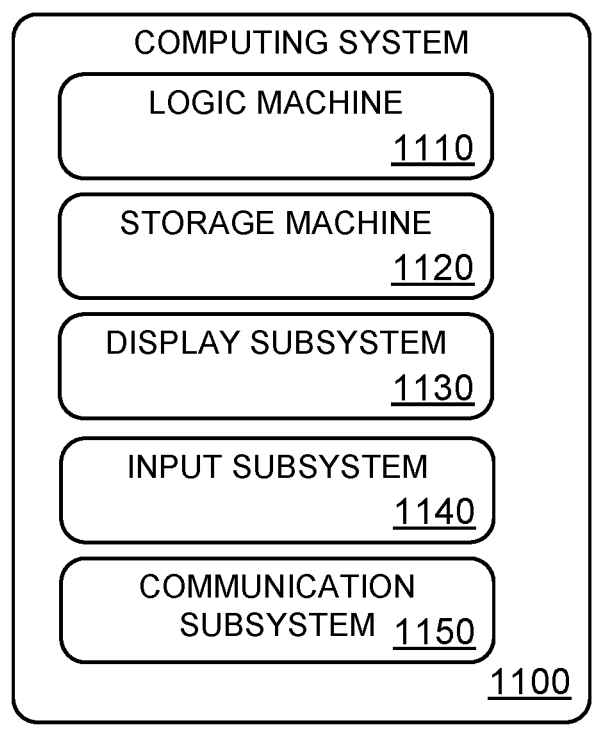
FIG. 11 schematically shows an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic machine 1110 and a storage machine 1120. Computing system 1100 may optionally include a display subsystem 1130, input subsystem 1140, communication subsystem 1150, and/or other components not shown in FIG. 11. Computing devices 200, 600, 900 and 1000 may be examples of computing system 1100.

Logic machine 1110 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1120 includes one or more physical devices configured to hold instructions executable by the logic machine to implement the methods and processes described herein. When such methods and processes are implemented, the state of storage machine 1120 may be transformed—e.g., to hold different data.

Storage machine 1120 may include removable and/or built-in devices. Storage machine 1120 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1120 may include volatile, nonvolatile, dynamic, static, read/write, read-only, random-access, sequential-access, location-addressable, file-addressable, and/or content-addressable devices.

It will be appreciated that storage machine 1120 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1110 and storage machine 1120 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1110 executing instructions held by storage machine 1120. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1130 may be used to present a visual representation of data held by storage machine 1120. This visual representation may take the form of a graphical user interface (GUI). As the herein described methods and processes change the data held by the storage machine, and thus transform the state of the storage machine, the state of display subsystem 1130 may likewise be transformed to visually represent changes in the underlying data. Display subsystem 1130 may include one or more display devices utilizing virtually any type of technology. Such display devices may be combined with logic machine 1110 and/or storage machine 1120 in a shared enclosure, or such display devices may be peripheral display devices.

When included, input subsystem 1140 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1150 may be configured to communicatively couple computing system 1100 with one or more other computing devices. Communication subsystem 1150 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

In one example, a computing system is presented. The computing system comprises an auditory system exposed to an environment. The auditory system comprises a first microphone configured to receive sonic waveforms and output audio signals; a first baffle structure located between the first microphone and the environment, the first baffle structure comprising multiple paths for every arriving sonic waveform, the first baffle structure configured to, based at least on a first actual angle of arrival for a first sonic waveform, induce frequency dependent amplitude differences and frequency dependent phase differences for the first sonic waveform over a range of frequencies of interest; and a processing system communicatively coupled to the first microphone. The processing system is configured to receive audio signals from the first microphone representing the first sonic waveform; to identify a source of the first sonic waveform based at least on the received audio signals; and to output an estimated angle of arrival for the first sonic waveform based at least on amplitudes and phases of the received audio signals and characteristics of the first baffle structure. In such an example, or any other example, the range of frequencies of interest additionally or alternatively comprise 100 Hz to 17 kHz. In any of the preceding examples, or any other example, the processing system is additionally or alternatively configured to track the source of the first sonic waveform from the actual angle of arrival to an updated angle of arrival with respect to the auditory system. In any of the preceding examples, or any other example, the processing system is additionally or alternatively configured to identify a source of a second sonic waveform at a second actual angle of arrival, different from the first actual angle of arrival. In any of the preceding examples, or any other example, the auditory system additionally or alternatively comprises: a second microphone configured to receive sonic waveforms and output audio signals; and a second baffle structure located between the second microphone and the environment, the second baffle structure comprising multiple paths for every arriving sonic waveform, the second baffle structure configured to, based at least on the first actual angle of arrival for the first sonic waveform, induce frequency dependent amplitude differences and frequency dependent phase differences for the first sonic waveform over the range of frequencies of interest. In any of the preceding examples, or any other example, the second baffle structure is additionally or alternatively asymmetric from the first baffle structure. In any of the preceding examples, or any other example, the second baffle structure is additionally or alternatively mirrored from the first baffle structure. In any of the preceding examples, or any other example, the processing system is additionally or alternatively configured to output the estimated angle of arrival for the first sonic waveform further based at least on amplitudes and phases of audio signals received at the second microphone. In any of the preceding examples, or any other example, the processing system is additionally or alternatively configured to output an estimated distance from the source of the first sonic waveform based at least on audio signals received at the first and second microphones. In any of the preceding examples, or any other example, the computing system additionally or alternatively comprises one or more additional microphones.

In another example, a method is presented. The method comprises receiving audio signals from an environment at a first microphone, the first microphone configured to receive sonic waveforms and output audio signals, the first microphone separated from the environment by a first baffle structure, the first baffle structure comprising multiple paths for every arriving sonic waveform, the first baffle structure configured to, based at least on a first actual angle of arrival for a first sonic waveform, induce frequency dependent amplitude differences and frequency dependent phase differences for the first sonic waveform over a range of frequencies of interest; identifying a source of a first sonic waveform based at least on the received audio signals; and outputting an estimated angle of arrival for the first sonic waveform based at least on amplitudes and phases of the received audio signals and characteristics of the first baffle structure. In such an example, or any other example, the method further comprises receiving audio signals from the environment at a second microphone, the second microphone configured to receive sonic waveforms and output audio signals, the second microphone separated from the environment by a second baffle structure, the second baffle structure comprising multiple paths for every arriving sonic waveform, the second baffle structure configured to, based at least on the first actual angle of arrival for the first sonic waveform, induce frequency dependent amplitude differences and frequency dependent phase differences for the first sonic waveform over the range of frequencies of interest; and outputting the estimated angle of arrival for the first sonic waveform further based at least on amplitudes and phases of the received audio signals and characteristics of the second baffle structure. In any of the preceding examples, or any other example, the method additionally or alternatively comprises outputting an estimated distance from the source of the first sonic waveform based at least on audio signals received at the first and second microphones. In any of the preceding examples, or any other example, the method additionally or alternatively comprises tracking the source of the first sonic waveform from the actual angle of arrival to an updated angle of arrival with respect to the auditory system. In any of the preceding examples, or any other example, the method additionally or alternatively comprises identifying a source of a second sonic waveform at a second actual angle of arrival, different from the first actual angle of arrival. In any of the preceding examples, or any other example, the method additionally or alternatively comprises adjusting characteristics of the first baffle based at least on the estimated angle of arrival. In any of the preceding examples, or any other example, adjusting characteristics of the first baffle additionally or alternatively comprises adjusting a conformation of the first baffle to minimize occlusion at the estimated angle of arrival. In any of the preceding examples, or any other example, the method additionally or alternatively comprises adjusting a gaze direction of a camera based at least on the estimated angle of arrival.

In yet another example, a computing system is presented. The computing system comprises an auditory system exposed to an environment. The auditory system comprises a first microphone configured to receive sonic waveforms and output audio signals; a first baffle structure located between the first microphone and the environment, the first baffle structure comprising multiple paths for every arriving sonic waveform, the first baffle structure configured to, based at least on a first actual angle of arrival for a first sonic waveform, induce frequency dependent amplitude differences and frequency dependent phase differences for the first sonic waveform over a range of frequencies of interest; a second microphone configured to receive sonic waveforms and output audio signals; and a second baffle structure located between the second microphone and the environment, the second baffle structure comprising multiple paths for every arriving sonic waveform, the second baffle structure configured to, based at least on the first actual angle of arrival for the first sonic waveform, induce frequency dependent amplitude differences and frequency dependent phase differences for the first sonic waveform over the range of frequencies of interest; and a processing system communicatively coupled to the microphone. The processing system is configured to receive audio signals from the first microphone and the second microphone representing the first sonic waveform; identify a source of the first sonic waveform based at least on the received audio signals; output an estimated angle of arrival for the first sonic waveform based at least on amplitudes and phases of the received audio signals and characteristics of the first baffle structure and the second baffle structure; and output an estimated distance from the source of the first sonic waveform based at least on audio signals received at the first and second microphones. In such an example, or any other example, the second baffle structure is additionally or alternatively asymmetric from the first baffle structure.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
an auditory system exposed to an environment, the auditory system comprising:
  a first microphone configured to receive sonic waveforms and output audio signals;
  a first baffle structure located between the first microphone and the environment, the first baffle structure comprising multiple paths for every arriving sonic waveform, the first baffle structure configured to, based at least on a first actual angle of arrival for a first sonic waveform, induce frequency dependent amplitude differences and frequency dependent phase differences for the first sonic waveform over a range of frequencies of interest; and
a processing system communicatively coupled to the first microphone, the processing system configured to:
  receive audio signals from the first microphone representing the first sonic waveform;
  identify a source of the first sonic waveform based at least on the received audio signals; and
  output an estimated angle of arrival for the first sonic waveform based at least on amplitudes and phases of the received audio signals and characteristics of the first baffle structure.

2. The computing system of claim 1, wherein the range of frequencies of interest comprise 100 Hz to 17 kHz.

3. The computing system of claim 1, wherein the processing system is further configured to:
track the source of the first sonic waveform from the actual angle of arrival to an updated angle of arrival with respect to the auditory system.

4. The computing system of claim 1, wherein the processing system is further configured to:
identify a source of a second sonic waveform at a second actual angle of arrival, different from the first actual angle of arrival.

5. The computing system of claim 1, wherein the auditory system further comprises:
a second microphone configured to receive sonic waveforms and output audio signals; and
a second baffle structure located between the second microphone and the environment, the second baffle structure comprising multiple paths for every arriving sonic waveform, the second baffle structure configured to, based at least on the first actual angle of arrival for the first sonic waveform, induce frequency dependent amplitude differences and frequency dependent phase differences for the first sonic waveform over the range of frequencies of interest.

6. The computing system of claim 5, wherein the second baffle structure is asymmetric from the first baffle structure.

7. The computing system of claim 5, wherein the second baffle structure is mirrored from the first baffle structure.

8. The computing system of claim 5, wherein the processing system is further configured to output the estimated angle of arrival for the first sonic waveform further based at least on amplitudes and phases of audio signals received at the second microphone.

9. The computing system of claim 5, wherein the processing system is further configured to output an estimated distance from the source of the first sonic waveform based at least on audio signals received at the first and second microphones.

10. The computing system of claim 5, comprising one or more additional microphones.

11. A method, comprising:
receiving audio signals from an environment at a first microphone, the first microphone configured to receive sonic waveforms and output audio signals, the first microphone separated from the environment by a first baffle structure, the first baffle structure comprising multiple paths for every arriving sonic waveform, the first baffle structure configured to, based at least on a first actual angle of arrival for a first sonic waveform, induce frequency dependent amplitude differences and frequency dependent phase differences for the first sonic waveform over a range of frequencies of interest;
identifying a source of a first sonic waveform based at least on the received audio signals; and
outputting an estimated angle of arrival for the first sonic waveform based at least on amplitudes and phases of the received audio signals and characteristics of the first baffle structure.

12. The method of claim 11, further comprising:
receiving audio signals from the environment at a second microphone, the second microphone configured to receive sonic waveforms and output audio signals, the second microphone separated from the environment by a second baffle structure, the second baffle structure comprising multiple paths for every arriving sonic waveform, the second baffle structure configured to, based at least on the first actual angle of arrival for the first sonic waveform, induce frequency dependent amplitude differences and frequency dependent phase differences for the first sonic waveform over the range of frequencies of interest; and
outputting the estimated angle of arrival for the first sonic waveform further based at least on amplitudes and phases of the received audio signals and characteristics of the second baffle structure.

13. The method of claim 12, further comprising:
outputting an estimated distance from the source of the first sonic waveform based at least on audio signals received at the first and second microphones.

14. The method of claim 11, further comprising:
tracking the source of the first sonic waveform from the actual angle of arrival to an updated angle of arrival with respect to the auditory system.

15. The method of claim 11, further comprising:
identifying a source of a second sonic waveform at a second actual angle of arrival, different from the first actual angle of arrival.

16. The method of claim 11, further comprising:
adjusting characteristics of the first baffle based at least on the estimated angle of arrival.

17. The method of claim 16, wherein adjusting characteristics of the first baffle comprises adjusting a conformation of the first baffle to minimize occlusion at the estimated angle of arrival.

18. The method of claim 11, further comprising:
adjusting a gaze direction of a camera based at least on the estimated angle of arrival.

19. A computing system, comprising:
an auditory system exposed to an environment, the auditory system comprising:
a first microphone configured to receive sonic waveforms and output audio signals;
a first baffle structure located between the first microphone and the environment, the first baffle structure comprising multiple paths for every arriving sonic waveform, the first baffle structure configured to, based at least on a first actual angle of arrival for a first sonic waveform, induce frequency dependent amplitude differences and frequency dependent phase differences for the first sonic waveform over a range of frequencies of interest;
a second microphone configured to receive sonic waveforms and output audio signals; and
a second baffle structure located between the second microphone and the environment, the second baffle structure comprising multiple paths for every arriving sonic waveform, the second baffle structure configured to, based at least on the first actual angle of arrival for the first sonic waveform, induce frequency dependent amplitude differences and frequency dependent phase differences for the first sonic waveform over the range of frequencies of interest; and
a processing system communicatively coupled to the microphone, the processing system configured to:
receive audio signals from the first microphone and the second microphone representing the first sonic waveform;
identify a source of the first sonic waveform based at least on the received audio signals;
output an estimated angle of arrival for the first sonic waveform based at least on amplitudes and phases of the received audio signals and characteristics of the first baffle structure and the second baffle structure; and output an estimated distance from the source of the first sonic waveform based at least on audio signals received at the first and second microphones.

20. The computing system of claim 19, wherein the second baffle structure is asymmetric from the first baffle structure.

\* \* \* \* \*